United States Patent

[11] 3,589,181

[72] Inventors Roland T. Palmatier;
Robert Clinton Holland, both of Mechanic St., Westerly, R.I. 02891
[21] Appl. No. 757,386
[22] Filed Sept. 4, 1968
[45] Patented June 29, 1971

[54] WEB TENSIOMETER
22 Claims, 14 Drawing Figs.
[52] U.S. Cl. ............................................. 73/144
[51] Int. Cl. ............................................. G01l 5/10
[50] Field of Search ............................. 73/143, 144

[56] References Cited
UNITED STATES PATENTS
| | | | |
|---|---|---|---|
| 2,100,653 | 11/1937 | Umansky | 73/144 X |
| 3,439,761 | 4/1969 | Laimins | 177/211 |
| 3,495,453 | 2/1970 | Angeid | 73/141 |
| 2,741,120 | 4/1956 | Ormsby, Jr. | 73/141 |
| 3,204,454 | 9/1965 | Friman et al. | 73/143 |
| 3,260,106 | 7/1966 | Hull et al. | 73/144 |

FOREIGN PATENTS
1,415,899 9/1965 France ........................ 73/144

OTHER REFERENCES
German printed application No. 1,263,350, March 1968, copy in 73—144

Primary Examiner—Charles A. Ruehl
Attorney—Yount, Flynn & Tarolli

ABSTRACT: A tensiometer for measuring the tension in a web is mounted between the walls of two spaced frame members and includes a roll, having a surface over which the web moves. The roll is mounted on a shaft which extends between two brackets that are secured respectively to the walls of the two spaced frame members, and each end of the shaft is supported by a lateral support member which is attached to the end of the shaft and to a portion of the bracket. The lateral support members are strained proportionally by a load force resulting from the tension in the web, and strain gauges are located on or in the lateral support members and connected into a bridge circuit to provide a signal indicative of the web tension. The movement of the web over the toll sometimes causes a torque force which increases the strain of one lateral support and decreases the strain of another, thereby distorting the indication of web tension. To eliminate the effect of the torque force, the strain gauges are located on laterally opposite supports and connected into a bridge circuit so that the increased strain sensed by the strain gauges located on one lateral support is offset by the decreased strain sensed by the strain gauges located on the laterally opposite support. Accordingly, an indication of web tension is provided which is not affected by a torque force resulting from the movement of the web over the roll. Additional safety supports are provided at each end of the shaft for engaging and supporting the shaft only upon the failure of the lateral supports.

PATENTED JUN29 1971 3,589,181

INVENTORS
ROLAND T. PALMATIER
R. CLINTON HOLLAND
BY Yount, Flynn & Tarolli
ATTORNEYS

INVENTORS
ROLAND T. PALMATIER
R. CLINTON HOLLAND

ATTORNEYS

INVENTORS
ROLAND T. PALMATIER
R. CLINTON HOLLAND
BY Yount, Flynn & Tarolli
ATTORNEYS 3,589,181

WEB TENSIOMETER

This invention relates to a tensiometer for providing an indication of the tension in a web.

The principal object of the present invention is the provision of a tensiometer for sensing tension in a web using strain-sensing transducers and which is relatively simple in construction, highly reliable, and accurate.

An object of the present invention is to provide a tensiometer which may be mounted between the walls of two spaced frame members and includes a member suspended at one end by a support which extends transversely to the axis of the member and is attached to a bracket secured to the wall of a frame member, the support is strained by a load force resulting from the tension in the web and strain-sensing means located thereon sense the strain and provides a signal indicative of the tension in the web.

Another object of the present invention is the provision of a new and improved tensiometer having a member over which a web moves and strain-sensing transducers associated therewith to sense movement of the member due to tension changes in the web and wherein torque forces acting on the member do not affect the web tension indication produced by the tensiometer.

Another object of the invention is to provide a tensiometer having shaft means suspended by supports which extend in laterally opposite directions from the shaft means, the laterally opposite supports are strained by forces exerted on the shaft means which include a load force resulting from the tension in the web and a torque force resulting from the movement of the web over the shaft means, and strain-sensing means are located on the laterally opposite supports and connected into a common bridge circuit to provide a signal which is indicative of the load force resulting from the tension of the web, but not the torque force resulting from the movement of the web over the shaft means.

A further object of the present invention is to provide a tensiometer which includes shaft means suspended by lateral supports between the walls of two spaced frame members, the lateral supports are strained by the movement of the web over the shaft means, and the tensiometer includes additional support means which are secured to the walls of the frame members for supporting the shaft means only upon failure of the lateral supports.

Still other objects, features and advantages will become apparent to those skilled in the art from a reading of the following description of the several embodiments constructed in accordance with the invention, taken in conjunction with the accompanying drawings wherein.

Figure 5:
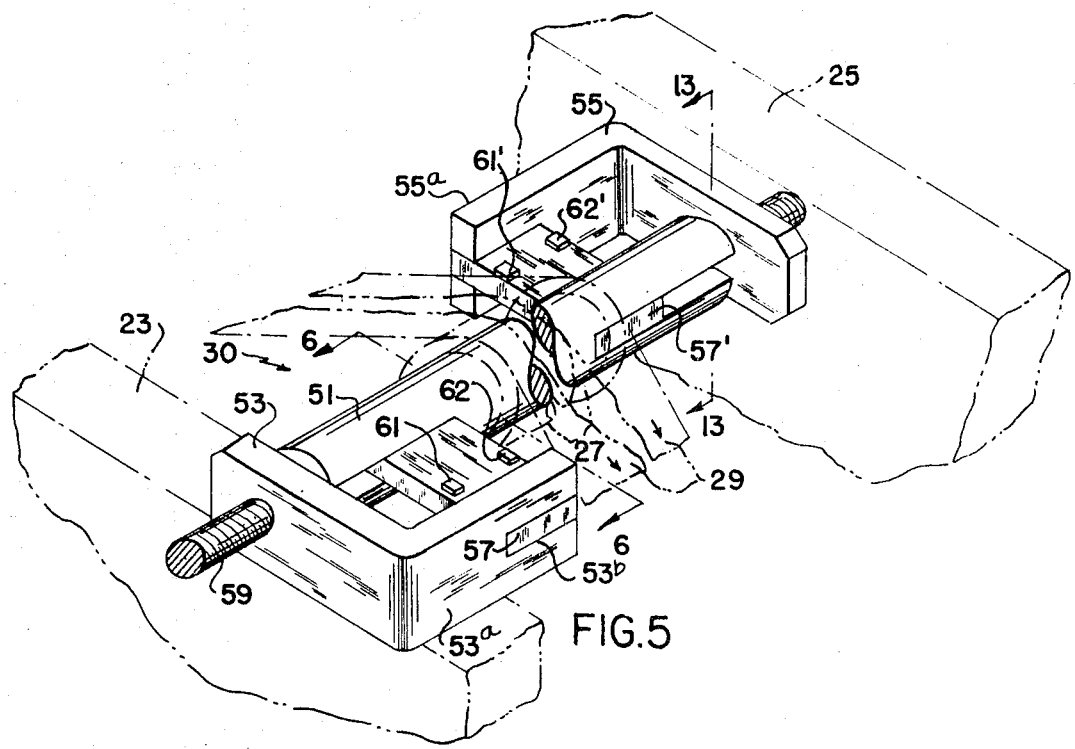
FIG. 5 is a diagrammatic view of another embodiment of a tensiometer constructed in accordance with the present invention.
Figure 8:
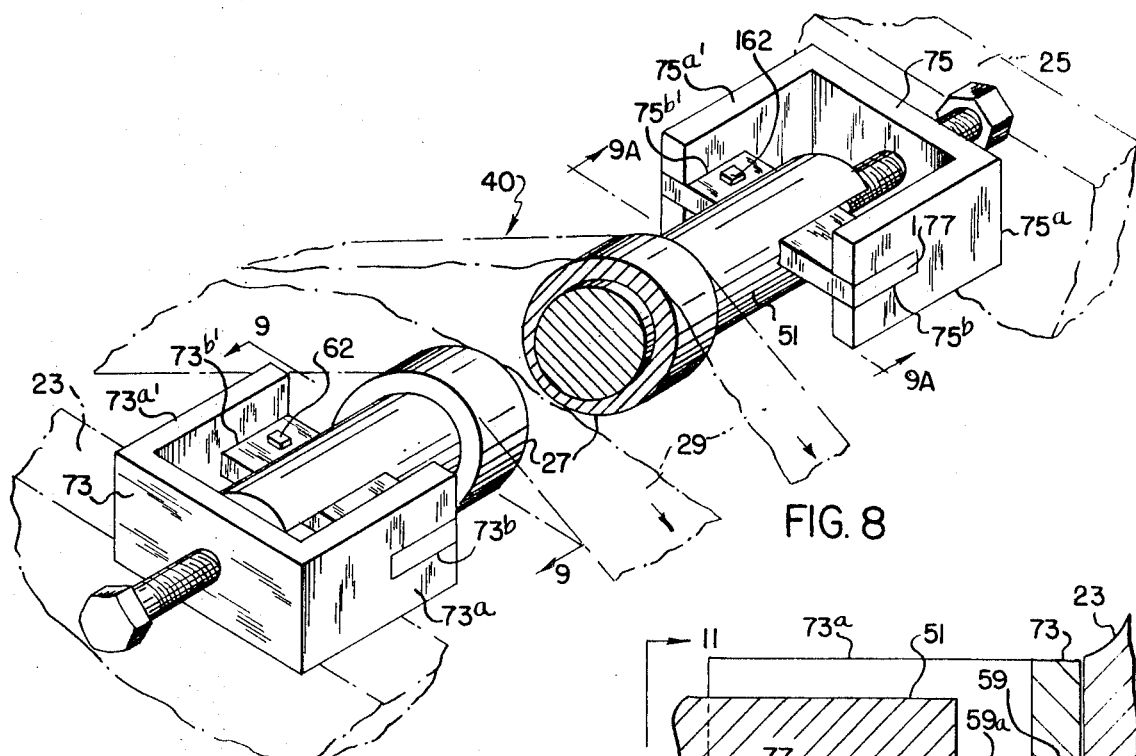
FIG. 8 is a diagrammatic view of still another embodiment of a tensiometer constructed in accordance with the present invention.
Figure 13:
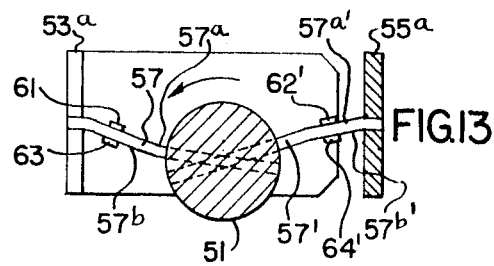
Figure 12:
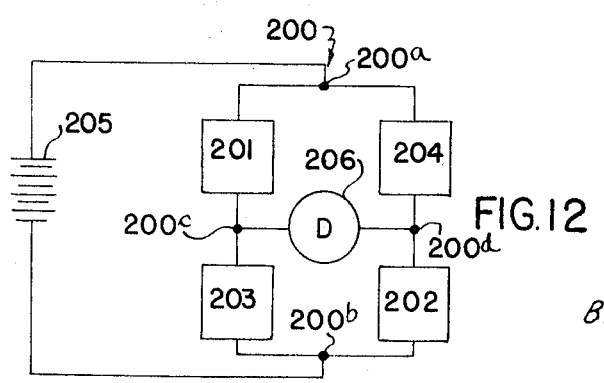

FIG. 12 is a circuit schematically illustrating the manner in which the strain-sensing means of FIGS. 5 and 8 may be connected to produce an indication of web tension which is not affected by the torque exerted on the shaft; and FIG. 13 is a sectional view taken along the lines 13–13 of FIG. 5 showing the manner in which the laterally opposite supports are deflected by a torque force exerted on the shaft.

Figure 1:
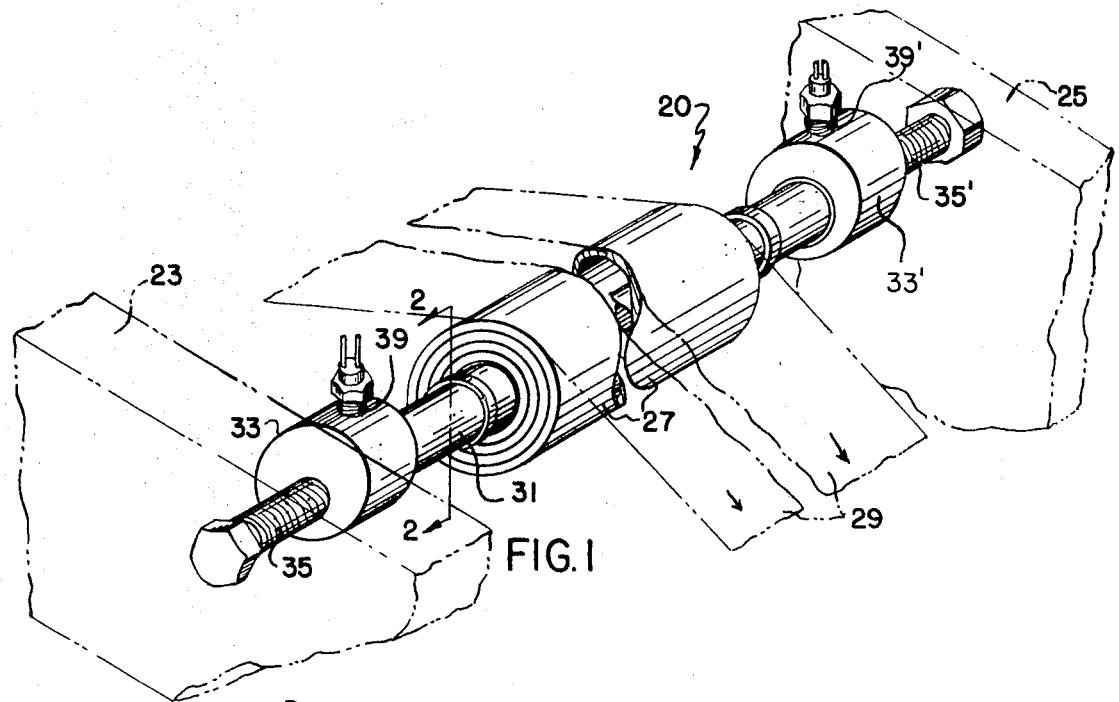
FIG. 1 is a diagrammatic view of an embodiment of a tensiometer constructed in accordance with the present invention.
Figure 2:
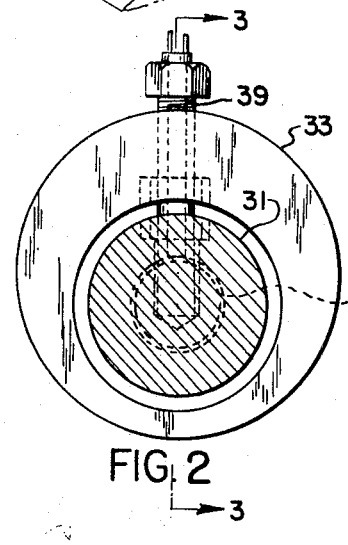
FIG. 2 is a sectional view, taken along the lines 2–2 of FIG. 1, showing the manner in which the shaft of the tensiometer is suspended in a bracket by a lateral support.
Figure 3:
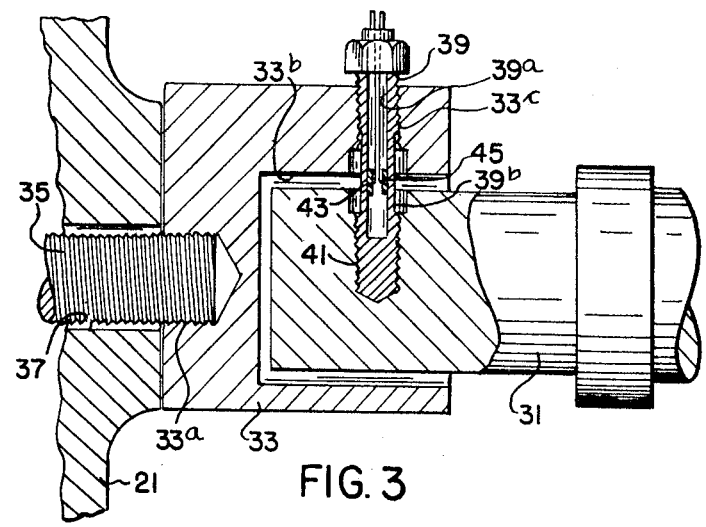
FIG. 3 is a cross-sectional view of FIG. 2, taken along the lines 3–3.

Referring now in detail to the figures of the drawings, FIGS. 1–3 illustrate a tensiometer, generally indicated 20 which is located between the walls of two spaced frame members 23, 25. The tensiometer 20 includes a roll 27 having a surface over which a web 29 moves. The roll 27 is mounted on a shaft 31 which extends between two brackets 33, 33' which are secured respectively to the walls of the frame members 23, 25. The bracket 33 is secured to the frame member 23 by any suitable means, such as a threaded bolt 35 inserted through a bore 37 in the frame member 33 and threaded into a threaded bore 33a in the bracket 33.

The bracket 33 has a bore 33b formed therein for receiving one end of the shaft 31 and another threaded bore 33c formed transversely thereto and extending through the upper portion of the bracket 33 for receiving a lateral support member in the form of a threaded bolt 39. A threaded bore 41 is formed adjacent to the end of the shaft 31 and extends transversely to the axis thereof. The bolt 39 is threaded through the bore 33c in the upper portion of the bracket 33 and into the threaded bore 41 in the shaft 31 so as to lie in a plane which extends through the axis of the shaft and support the shaft 31 in laterally spaced relation to the wall of the bore 33b. If the bolt 39 fails, however, the wall of the bore 33b of the bracket 33 serves as a safety support for the end of the shaft 31.

When the web 29 moves over the surface of the roll 27, a load force resulting from the tension in the web 29 is exerted on the bolt 39 and causes it to undergo strain in the form of tension. The strain of the bolt 39 is proportional to the load force exerted on it, and strain gauges 43, 45 are located in an axial cavity 39a of the bolt 39 for sensing the strain and providing an indication of the tension in the web 29. The strain gauges 43, 45 desirably have matched electrical characteristics and may be of a conventional semiconductor, foil, or wire type. The strain gauges 43, 45 have an electrical impedance which is responsive to strain, and for illustrative purposes only, may be considered to increase with tension and decrease with compression. The sensitivity of the strain gauges 43, 45 is increased by locating them adjacent to a necked down portion 39b of the bolt 39 where the strain is concentrated.

Figure 4:
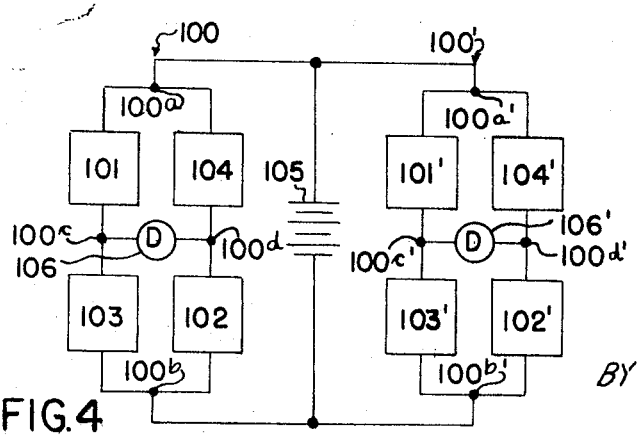
FIG. 4 is a circuit configuration showing the manner in which the strain-sensing means are connected to form a bridge circuit to provide a signal indicative of the strain of each lateral support.

To provide an electrical signal indicative of the tension in the web 29, the stain gauges 43, 45 are connected into a conventional bridge circuit, generally indicated 100 in FIG. 4. The circuit 100 has a pair of input terminals 100a, 100b and a pair of output terminals 100c, 100d. The strain gauges 43, 45 are connected between different input and output terminals as a pair of opposite bridge arms 101, 102 respectively while a pair of suitable impedance means, e.g. resistors, are connected as the other pair of opposite bridge arms 103, 104. The impedance means may be variable and provide an electrical impedance equal to that of the strain gauges 43, 45 in an unstrained condition. The input terminals 100a, 100b of the bridge circuit 100 are connected to a suitable source of electrical power, e.g. a battery 105, for establishing a voltage drop across each of the arms 101—104 of the bridge 100. A detector 106 is connected to the output terminals 100c, 100d to sense a difference in potential there between resulting from an unbalanced condition of the bridge 100.

When the bolt 39 is not strained by the web 29 or strained the desired amount, the strain gauges 43, 45 in the bridge arms 101, 102 have an impedance equal to the impedance in the other pair of bridge arms 103, 104. Accordingly, the voltage drops across all of the bridge arms 101—104 are equal, and the detector 106 does not sense a difference in potential between the output terminals 100c, 100d of the bridge circuit. However, when the web 29 moves over the surface of the roll 27, and a load force resulting from the tension in the web 29 strains the bolt 39, the tension in the bolt 39 causes the impedance of the strain gauges 43, 45 to increase which unbalances the bridge circuit 100. Accordingly, the voltage drops across the pair of opposite bridge arms 101, 102 become greater than the voltage drops across the other pair of opposite bridge arms 103, 104, and the detector 106 senses a difference in potential between the output terminals 100c, 100d which is indicative of the tension in the web 29.

The other end of the shaft 31 is supported by another bolt 39' in the other bracket 35 which is secured to the other frame member 25 in the same manner as hereinbefore described with respect to bolt 39 and bracket 33, and accordingly corresponding reference numerals have been placed on corresponding parts. The strain gauges 43', 45' associated with the bolt 39' are connected into a bridge circuit, generally indicated 100', which is identical to the bridge circuit 100 previously described and which provides a signal indicative of the strain of the bolt 39' due to a load force resulting from the tension in the web 29. Accordingly, signals indicative of the tension in the web 29 may be produced from the bolts at either or both ends of the shaft 31, and the signals may be compared to indicate a nonuniform tension across the width of the web 29.

Figure 7:
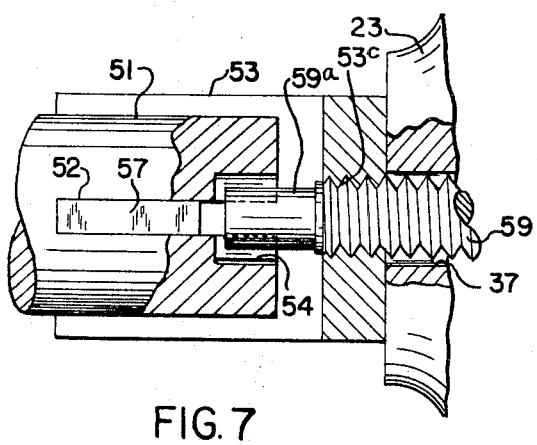
FIG. 7 is a cross-sectional view of FIG. 6, taken along the lines 7–7.
Figure 6:
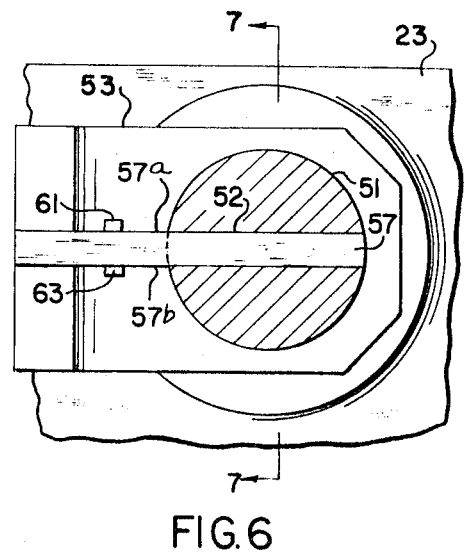
FIG. 6 is a sectioned view, taken along the lines 6–6 of FIG. 5, showing the manner in which the shaft of the tensiometer is suspended by a lateral support.

Another embodiment of a tensionmeter 30 constructed in accordance with the present invention is shown in FIGS. 5—7. In this embodiment, the roll 27 is mounted on a shaft 51 having a slot 52 formed centrally in each end which extends transversely to the axis thereof. The shaft 51 extends between two brackets 53, 55 secured to the walls of the frame members 23, 25, respectively. The bracket 53 is L-spaced and has a portion 53a extending alongside and parallel to the shaft 51 in laterally spaced relation thereto with a slot 53b formed therein parallel to the axis of the shaft 51. One end of a beam or support member 57 is secured in the slot 53b of the L-shaped bracket 53 while the of the end of the beam 57 is secured in the slot 52 of the shaft 51 so as to be in a plane which extends through the axis of the shaft and form a cantilever support for the shaft 51.

To provide the shaft with an additional safety support, a bore 54 is formed in each end of the shaft 51 for receiving the end of a threaded bolt 59 which serves as a support member. The bolt 59 receives the bracket 53 connected to the frame 23. The threaded bolt 59 has a smooth cylindrical end 59a and is inserted through a bore 37 in the frame member 23 and threaded through a threaded bore 53c in the L-shaped bracket 53 until the smooth cylindrical end 59a extends into the bore 54 at the end of the shaft 51 in laterally spaced relation to the walls thereof. Normally, the bolt 59 does not engage the shaft 51 because the bore 54 in the shaft 51 is larger than the cylindrical end 59a of the bolt 59. However, if the cantilever beam 57 fails, then the bolt 59 will engage and support the end of the shaft 51.

When the web 29 moves over the roll 27, a load force resulting from the tension in the web 29 is exerted on the beam 57 which causes it to be deflected and strained with a surface portion 57a thereof undergoing tension and an opposite surface portion 57b undergoing compression. The strain of the beam 57 is proportional to the load force exerted on it, and two paris of strain gauges 61, 62 and 63, 64 of the same type previously described, are located on the cantilever support 57 to sense the strain and provide an indication of the tension in the web 29. One pair of strain gauges 61, 62 are located on the surface portion 57a undergoing tension, while the other pair of strain gauges 63, 64 are located on the opposite surface portion 57b undergoing compression. The location of the strain gauges on the opposite surfaces 57a, 57b of the cantilever support is not critical so long as they are all located at the same distance from the portion 53a of the bracket 53.

An electrical signal which is indicative of the tension of the web 29 may be provided by connecting the strain gauges 61—64 into the previously described bridge circuit 100. The strain gauges 61, 62 on the cantilever surface portion 57a are connected as one pair of opposite bridge arms 101, 102, while the strain gauges 63, 64 on the opposite cantilever surface portion 57b are connected as the other pair of opposite bridge arms 103—104. When the cantilever support 57 is not deflected by the web 29, the strain gauges 61—64 have equal impedances. Accordingly, the voltage drops across all of the bridge arms 101—104 are equal, and the detector 106 does not sense a difference in potential between the output terminals 100c, 100d. However, when the web 29 moves over the surface of the roll 27, and a load force resulting from the tension in the web 29 deflects the cantilever support 57, the surface portion 57a undergoes tension which increases the impedance of the strain gauges 61, 62, while the opposite surface portion 57b undergoes compression, which decreases the impedance of the strain gauges 63, 64. Accordingly, the voltage drops across the pair of opposite bridge arms 101, 102 are increased while the voltage drops across the other pair of opposite bridge arms 103, 104 are decreased, and the detector 106 senses a difference in potential at the output terminals 100c, 100d which is indicative of the tension in the web 29.

The other end of the shaft 51 is supported in another bracket 55 by another cantilever support 57' in the same manner as hereinbefore described, and accordingly, corresponding reference numerals have placed on corresponding parts. Two pairs of strain gauges 61'—64' are associated with the other cantilever beam 57' supporting the opposite end of the shaft and are connected into the other bridge circuit 100' in the same identical manner to provide a signal indicative of the strain of the other cantilever beam 57' resulting from the tension in the web 29. Accordingly, signals indicative of the tension in the web 29 may be produced from the cantilever supports at either or both ends of the shaft 51, and the signals may be compared to indicate a nonuniform tension across the width of the web 29.

Figure 9A:
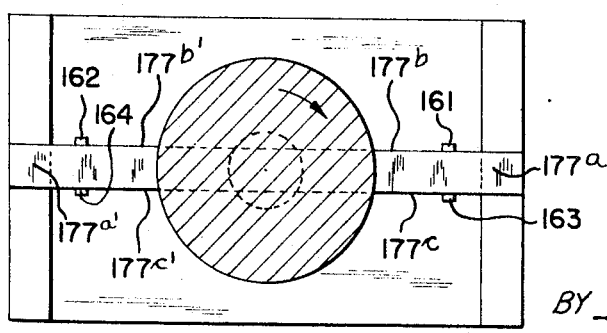
FIGS. 9 and 9A are sectional views taken along the lines 9–9 and 9A–9A of FIG. 8 showing the manner in which the shaft of the tensiometer is suspended by a lateral support means attached to a bracket.
Figure 10:
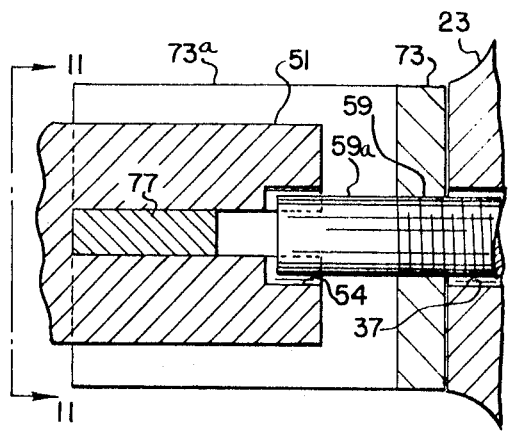
FIG. 10 is a cross-sectional view of FIG. 9 taken along the lines 10–10.
Figure 9:
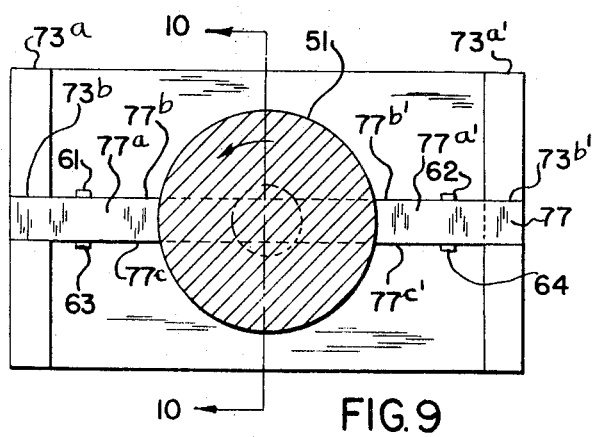

Still another embodiment of a tensiometer 40 constructed in accordance with the present invention is shown in FIGS. 8—10. In this embodiment, the roll 27 is mounted on a shaft 51 which is identical to the shaft 51 described in the previous embodiment 30, and accordingly identical reference numerals have been placed on identical portions thereof. The shaft 51 extends between two U-shaped brackets 73, 75 which are secured to the walls of the frame members 23, 25, respectively. The U-shaped bracket 73 has two parallel portions 73a, 73a' which extend along opposite sides of the shaft 51 in laterally spaced relation thereto and which have a slot 73b, 73b', respectively, formed therein parallel to the axis of the shaft 51 for receiving a lateral support member in the form of a beam 77. The opposite ends of the beam 77 are secured in the slots 73b, 73b' in the parallel portions 73a, 73a' of the U-shaped bracket 73, and the center portion of the beam 77 is secured in the slot 52 in the end of the shaft 51 so as to lie in a plane which extends through the axis of the shaft and form two laterally opposite supports 77a, 77a' having opposite surface portions 77b, 77c and 77b', 77c', respectively.

As described in the preceding embodiment 30 shown in FIGS. 5—7, the end of the shaft 51 is provided with an additional safety support in the form of a threaded bolt 59 having a smooth cylindrical end 59a. The bolt 59 is inserted through the bore 37 in the frame member 23 and is threaded through a threaded bore 73c formed in the bracket 73 for receiving the bolt 59 until the smooth cylindrical end 59a extends into the slot 52 at the end of the shaft 51. The bolt 59 secures the bracket 73 to the frame 23. It should be apparent that the safety provided by the bolt 59 could, if desired, be eliminated. Moreover, a shaft adapter could be used for supporting the shaft of the roll and the adapter could be provided with the slot 52 for the cantilever support.

Figure 11:
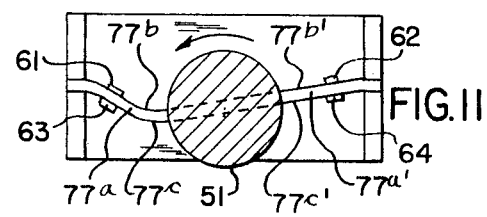
FIG. 11 is a view similar to FIG. 9 showing the manner in which the lateral support means is deflected by a torque force exerted on the shaft.

When the web 29 moves over the roll 27, a load force resulting from the tension in the web 29 is exerted on the center of the beam 77 which causes the two laterally opposite supports 77a, 77a' to be deflected and strained with the surface portions 77b, 77b' undergoing tension and the opposite surface portions 77c, 77c' undergoing compression. The strain of the laterally opposite supports 77a, 77a' is proportional to the load force exerted on it, and the strain may be sensed to provide an indication of the tension in the web 29 by locating strain gauges 61—64, of the type previously described, on the laterally opposite supports 77a, 77a' in the same manner as the cantilever arrangement. However, often times the movement of the web 29 over the roll 27 may cause a torque force to be exerted on the beam 77 which alters the deflection of the laterally opposite supports 77a, 77a', as shown in FIG. 11. The effect of the torque force is to distort the indication of the tension in the web 29 by increasing the deflection, and consequently the strain, of one of the laterally opposite supports, e.g. 77a, while decreasing the deflection, and the attendant strain, of the other laterally opposite support 77a'. Accordingly, if all of the strain gauges 61—64 are located on the lateral support 77a, the indication of web tension will be greater than if all of the strain gauges are located on the opposite lateral support 77a'.

It has been found, however, that the effect of the torque force can be cancelled from the indication of the tension in the web 29 by locating the strain gauges 61—64 on both of the laterally opposite supports 77a, 77a'. As shown in FIG. 9, one strain gauge 61 is located on the surface portion 77b and one strain gauge 62 is located on surface portion 77b'. These gauges 61, 62 undergo tension, while another pair of strain gauges 63, 64 located on the surface portions 77c, 77c', respectively, undergo compression. With the strain gauges 61—64 located on the opposite surface portions of both of the laterally opposite supports 77a, 77a', the increased strain of the lateral support 77a due to a torque force may be utilized to offset and cancel the decreased strain of the opposite laterally support 77a'. The location of the strain gauges 61—64 on the opposite surface portions 77b, 77c, 77b', 77c' on the laterally opposite supports 77a, 77a' is not critical so long as they are all located the same distance from the respective parallel portions 73a, 73a' of the U-shaped bracket 73, and the torque is applied midway between parallel portions 73a, 73a'. While in the embodiment of FIG. 5, there is shown two strain gauges on each side of the beams, it should be clear that a single strain gauge could be located on each side of the beams, as in FIG. 8. Moreover, it should also be apparent with respect to the embodiment of FIG. 9 that a single strain gauge could be located on surface 77b and a single strain gauge could be located on surface 77c'. With no other strain gauges present in the system, except in a similar manner on the other end of the roll 51, the four strain gauges in such a system could be arranged in a bridge circuit to provide the desired signal.

An electrical signal, which is indicative of the web tension may be provided by connecting the strain gauges 61—64 into the previously described bridge circuit 100. The strain gauges 61, 62 on the surface portion 77b, 77b' of the laterally opposite supports 77a, 77a' are connected as one pair of opposite bridge arms 101, 102, while the strain gauges 63, 64 on the opposite surface portions 77c, 77c' of the lateral supports 77a, 77a' respectively, are connected as the other pair of opposite bridge arms 103, 104. When the laterally opposite supports 77a, 77a' are not deflected by either a load force or a torque force resulting from the movement of the web 29 over the roll 27, the strain gauges 61—64 have equal impedances. Accordingly, the voltage drops across all the bridge arms 101—104 are equal, and the detector 106 does not sense a difference in potential between the bridge output terminals 100c, 100d. If only a load force resulting from the tension in the web 29 is exerted on the beam 77, then the laterally opposite supports 77a, 77a' are equally deflected with the surface portions 77b, 77b' undergoing tension which increases the impedance of the strain gauges 61—62, while the opposite surface portions 77c, 77c' undergo compression which decreases the impedance of the strain gauges 63—64. Accordingly, the voltage drops across the pair of opposite bridge arms 101, 102 are increased, while the voltage drops across the pair of the opposite bridge arms 103, 104 are decreased, and the detector 106 senses a difference in potential at the output terminals 100c, 100d which is indicative of the tension in the web 29.

However, if the web exerts a torque force on the beam 77 in addition to a load force, then the deflection of the lateral support 77a is increased, while the deflection of the opposite lateral support 77a' is decreased. The increased deflection of the lateral support 77a increases the tension and compression of the opposite surface portions 77b, 77c, respectively, thereby increasing the impedance of the strain gauge 61 and decreasing the impedance of the strain gauge 63, while the decreased deflection of the lateral support 77a' decreases the tension and compression of the opposite surface portions 77b', 77c', respectively, thereby decreasing the impedance of the strain gauge 62 and increasing the impedance of the strain gauge 64. Due to the location of the strain gauges on both laterally opposite supports 77a, 77b, however, the torque force does not effect the indication of web tension because the changes in the impedance of the strain gauges 61—64 resulting from the torque force are canceled in the bridge circuit. Accordingly, an increased voltage drop in the bridge arm 101, resulting from the increased tension sensed by the strain gauge 61, is matched by an increased voltage drop in the bridge arm 104 which results from the decreased compression sensed by the strain gauge 64, while a reduced voltage drop in the bridge arm 103 which results from the increased compression sensed by strain gauge 63, is matched by a reduced voltage drop of the bridge arm 102 which results from the decreased tension sensed by strain gauge 62. Consequently, the difference of potential sensed by the detector 106 at the output terminals 100c, 100d is indicative of only the load force resulting from the tension in the web 29.

The other bracket 75 supports the other end of the shaft 51 by means of another beam 177 in the same manner as is hereinbefore described. As shown in FIG. 9A, one strain gauge 161—164 is located on each surface 177b, 177b', 177c, 177c', respectively, and are connected into another bridge circuit 100' in the same manner hereinbefore described to provide a signal indicative of the strain of the other laterally opposite supports due to a load force resulting from the tension in the web. Accordingly, signals indicative of the web tension may be produced from the laterally opposite supports at either or both ends of the shaft 51, and the signals may be compared to indicate a nonuniform tension across the width of the web 29.

It has been found that the strain gauges located on the laterally opposite supports at both ends of the previously described embodiment of a tensiometer 40 may be connected into a common bridge circuit, generally indicated 200 in FIG. 12, to produce a signal indicative of the tension in the web 29 which is unaffected by a torque force due to the movement of the web 29 over the roll 27. The bridge circuit 200 has a pair of input terminals 200a, 200b which are connected to a suitable source of voltage, e.g. a battery 205, and a pair of output terminals 200c, 200d which are connected to a detector 206 for sensing a difference in potential between the output terminals. A pair of strain gauges, e.g. 61, 162, located respectively on the surface portions 77b, 177b', are connected between different input and output terminals of the bridge circuit 200 as one pair of opposite bridge arms 201, 202. Another pair of strain gauges 63, 164, which are located respectively on the surface portions 77c, 177c', are connected as the other pair of opposite bridge arms 203, 204, respectively. As previously mentioned, the strain gauges have matched electrical characteristics, and accordingly, when the lateral supports 77a, 77a' and 177a, 177a' are not deflected by the web 29, the voltage drops across all of the bridge arms 201—204 are equal and the detector 206 does not sense a difference of potential between the output terminals 200c, 200d.

When the web 29 moves over the surface of the roll 27, and a load force resulting from the web tension deflects the lateral supports, the surface portions 77b, 177b' undergo tension which increases the impedance of the strain gauges 61, 162, while the surface portions 77c, 177c' undergo compression which decreases the impedance of the strain gauges 63, 164, respectively. Accordingly, the voltage drops across the pair of opposite bridge arms 201, 202 are increased while the voltage drops across the other pair of opposite bridge arms 203, 204 are decreased, and the detector 206 senses a difference of potential between the output terminals 200c, 200d which is indicative of the total web tension.

However, when the movement of the web 29 over the roll 27 causes a torque force to be exerted on the lateral supports in addition to the load force, then the lateral supports 77a, 177a are deflected more than the opposite lateral supports 77a', 177a'. The increased deflection of the lateral support 77a increases the tension of the surface portion 77b, thereby increasing the impedance of the strain gauge 61, while the increased deflection of the lateral support 77a increases the compression of the surface portion 77c which decreases the impedance of the strain gauge 63. The decreased deflection of the lateral support 177a' decreases the tension of the surface portion 177b' thereby decreasing the impedance of the strain gauge 162, while the decreased deflection of the lateral support 177a' decreases the compression of the surface portion 177c' which increases the impedance of the strain gauge 164.

Due to the connection of the strain gauges into a common bridge circuit 200, however, the effect of the torque force is eliminated from the indication of total web tension because the changes in the impedances of the strain gauges are canceled in the bridge circuit 200. Accordingly, the increased impedance of the strain gauge 61, resulting from increased tension, produces an increased voltage drop in the bridge arm 201 which is matched by an increased voltage drop in the bridge arm 204 due to the increased impedance of the strain gauge 164 which results from decreasing compression, while a reduced voltage drop in the bridge arm 203, resulting from the decreased impedance of the strain gauge 63 due to the increased compression, is matched by a reduced voltage drop in the bridge arm 202 due to the decreased impedance of the strain gauge 162 resulting from decreased tension. Consequently, the detector 206 senses a difference of potential between the output terminals 200c, 200d which is indicative of the load force resulting from the web tension, but not the torque force resulting from the movement of the web over the roll.

The previously described embodiment of a tensiometer 30, which utilized cantilever supports 57, 57' and is shown in FIGS. 5—7, is also effected by a torque force which may result from the movement of the web 29 over the roll 27. The effect of the torque force, as shown in FIG. 13, is to increase the deflection of the cantilever support 57 and decrease the deflection of the cantilever support 57', thereby increasing the strain sensed by the strain gauges 61—64 while decreasing the strain sensed by the strain gauges 61'—64'. Accordingly, the effect of the torque force is to produce an indication of greater web tension by the bridge 100 and an indication of lesser web tension by the bridge 100'.

However, it has been found that a tensiometer using laterally opposite cantilever supports can provide an indication of web tension, wherein the effect of the torque force is eliminated, by connecting strain gauges on the opposite surface portions of both cantilever supports 57, 57' into the common bridge circuit 200, which is shown in FIG. 12. In this arrangement, a pair of strain gauges, e.g. 61, 62' located respectively on the cantilever support portions 57a, 57a' which undergo tension, are connected between different input and output terminals of the bridge circuit 200 as one pair of opposite bridge arms 201, 202, while another pair of strain gauges, e.g. 63, 64', located respectively on the cantilever surface portions 57b, 57b' which undergo compression, are connected as the other pair of opposite bridge arms 203, 204. As previously mentioned, the strain gauges have matched electrical characteristics, and when the cantilever supports 57, 57' are not deflected, the voltage drops across all the bridge arms 201—204 are equal and a difference of potential between the output terminals 200c, 200d is not sensed by the detector 206.

When the web moves over the surface of the roll 27 and a load force resulting from the tension of the web deflects the cantilever supports 57, 57', the surface portions 57a, 57a' undergo tension which increases the impedance of the strain gauges 61, 62', while the opposite surface portions 57b, 57b' undergo compression which decreases the impedance of the strain gauges 63, 64'. Accordingly, the voltage drops across the pair of opposite bridge arms 201, 202 are increased, while the voltage drops across the other pair of opposite bridge arms 203, 204 are decreased, and the detector senses a difference in potential between the output terminals 200c, 200d which is indicative of the web tension.

However, when the movement of the web 29 over the roll 27 causes a torque force to be exerted on the cantilever supports 57, 57' in addition to a load force as shown in FIG. 13, then the cantilever support 57 is deflected more than the laterally opposite cantilever support 57'. The increased deflection of the cantilever support 57 increases the tension of the surface portion 57a thereby increasing the impedance of the strain gauge 61, and increases the compression of the surface portion 57b which decreases the impedance of the strain gauge 63. The decreased deflection of the laterally opposite cantilever support 57' decreases the tension of the surface portion 57a', thereby decreasing the impedance of the strain gauge 62', and decreases the compression of the surface portion 57b', b', increases the impedance of the strain gauge 64'.

Due to the connection of the strain gauges into the common bridge circuit 200, the effect of the torque is eliminated from the indication of web tension because the effect of the impedance changes of the strain gauges are canceled in the bridge circuit 200. Accordingly, an increased voltage drop in the bridge arm 201 which results from the increased tension sensed by the strain gauge 61, is matched by an increased voltage drop in the bridge arm 204 which results from the decreased compression sensed by the strain gauge 64', and a reduced voltage drop in the bridge arm 203, resulting from the increased compression sensed by the strain gauge 63, is matched by a decreased voltage drop in the bridge arm 202 which results from the decreased tension sensed by the strain gauge 62'. Consequently, the detector 206 senses a difference of potential between the output terminals 200c, 200d which is indicative of the load force due to the web tension but not the torque force resulting from the movement of the web 29 over the roll 27.

While the different embodiments disclosed above discuss various strain gauge arrangements which may result in indicating the total web tension and others only the tension as measured at one edge of the web, the strain gauges in any embodiment could be arranged to indicate either total tension or tension as measured at the edge of the web.

While only a limited number of embodiments have been illustrated and described, it will be apparent to those skilled in the art that various modifications and improvements may be made without departing from the scope and spirit of the invention. Accordingly, it is to be understood that the invention is not to be limited by the illustrative embodiments, but only by the scope of the appended claims.

What I claim is:

1. A tensiometer for providing an indication of a tension in a web comprising two spaced frame members, a roll located between said frame members and having a surface over which the web moves, said roll having a force exerted on the surface thereof by a tension in the web, shaft means for supporting said roll, said shaft means projecting from the opposite ends of said roll, a bracket secured to one of said frame members, a support member attached to said bracket and extending in a direction transverse to said shaft means and lying in a plane which extends through the longitudinal axis of said roll, said support member being operatively connected to said shaft means to support said shaft means and strained by a force resulting from a tension in the web, and strain-sensing means located on said support member for sensing the strain of said support member and providing an indication of a tension in the web.

2. A tensiometer according to claim 1 wherein said bracket has a portion thereof extending substantially parallel to said shaft means in spaced relation thereto with said support member being attached to said portion of said bracket.

3. A tensiometer according to claim 1 wherein said support member extends into an opening in a portion of said shaft means, and said tensiometer further comprises shaft-supporting means in spaced relation to said shaft and adapted to engage and support said shaft means upon failure of said support member.

4. A tensiometer according to claim 1, further comprising a second bracket secured to the other of said frame members, a second support member attached to said second bracket extending in a direction transverse to said shaft means and lying in a plane which extends through the longitudinal axis of said roll, said second support member being operatively connected to said shaft means and strained by a force resulting from a tension in the web, and strain-sensing means located on said second support member for sensing the strain of said second support member and providing an indication of a tension in the web.

5. A tensiometer according to claim 4, wherein said first and second support members extend from said shaft means in a common lateral direction.

6. A tensiometer according to claim 4, wherein said first and second support members extend from said shaft means in laterally opposite directions with respect to each other.

7. A tensiometer according to claim 4, wherein said first and second support members each extend transversely from said shaft means in laterally opposite directions.

8. A tensiometer for providing an indication of a tension in a web comprising frame means, a longitudinally extending member having a force exerted on a surface thereof by a tension in the web, a lateral support member secured to said frame means and connected with an end of said member, said lateral support member extending generally transverse to said end of said member and providing the sole support for said end of said member, said lateral support member being strained by a force resulting from a tension in the web, strain-sensing means located on said lateral support member and having an electrical impedance responsive to the strain of said support member, and a bridge circuit including said strain-sensing means and responding to the strain sensed by the sensing means located on said lateral support member for providing a signal indicative of a tension in the web.

9. A tensiometer according to claim 8, further comprising a second lateral support member secured to said frame means and extending laterally to the other end of said member, said second lateral support member being connected with said member and strained by a force resulting from a tension in the web, and strain-sensing means located on said second lateral support for providing a signal indicative of a tension in the web.

10. A tensiometer according to claim 9, wherein said ends of said member comprise shaft means for supporting said member and said first and second lateral support members extend from said shaft means in a common lateral direction.

11. A tensiometer according to claim 9, wherein said ends of said member comprise shaft means for supporting said member and said first and second lateral support members extend from said shaft means in laterally opposite directions with respect to each other.

12. A tensiometer according to claim 9, wherein said ends of said member comprise shaft means for supporting said member and said first and second lateral support members each extend from said shaft means in laterally opposite directions.

13. A tensiometer according to claim 8, wherein said frame means comprises two spaced frame members, said member being located between said frame members, a bracket secured to one of said frame members, and said support member being attached to said bracket.

14. A tensiometer according to claim 13 wherein said bracket has a portion thereof extending parallel to said member, and said support member is attached to said portion of said bracket.

15. A tensiometer according to claim 13, further comprising a second bracket secured to the other of said frame members, and a second support member attached to said bracket and connected with said member.

16. A tensiometer for measuring a tension in a web comprising frame means, a longitudinally extending member having a surface adapted to have a force exerted thereon by a tension in the web, a first lateral support member secured to said frame means and connected with an end of said member, a second lateral support member secured to said frame means and connected with the other end of said member, said first lateral support member having a section thereof which extends from said member in one lateral direction with respect to the longitudinal axis thereof and said second lateral support member having a section which extends from said member in an opposite lateral direction with respect to the longitudinal axis thereof, said sections of said first and second lateral support members being deflected and strained by a force resulting from the tension in the web, said section of said first and second lateral support members having opposite surface portions which undergo tension and compression respectively upon deflection, strain-sensing means located on the opposite surface portions respectively of said sections of said first and second lateral support members, said strain-sensing means having an electrical impedance responsive to the tension and compression respectively of said surface portions, and bridge circuit means including said strain-sensing means for providing a signal indicative of a tension in the web.

17. A tensiometer according to claim 16 wherein said strain-sensing means located on the opposite surface portions of said first lateral support member are connected into a first bridge circuit to provide a first signal indicative of a tension in the web, and said strain-sensing means located on the opposite surface portions of said second lateral support member are connected into a second bridge circuit to provide a second signal indicative of a tension in the web.

18. A tensiometer according to claim 16 wherein said bridge circuit means includes a single bridge circuit having two pairs of opposite bridge arms with said strain-sensing means responsive to tension being connected as one pair of opposite bridge arms and with said strain-sensing means responsive to compression being connected as the other pair of opposite bridge arms.

19. A tensiometer according to claim 18 wherein said second lateral support member has an opposite section which extends from said member in a laterally opposite direction with respect to the longitudinal axis thereof, said opposite section of said second lateral support member being deflected and strained by a force resulting from a tension in the web and having opposite surface portions which undergo tension and compression respectively upon deflection, strain-sensing means having an electrical impedance responsive to strain and being located on the opposite surface portions of said opposite section of said second lateral support member and said bridge circuit means including a second bridge circuit for providing a signal indicative of a tension in the web in response to the deflection of said second lateral support member, said second bridge circuit having two pairs of opposite bridge arms with said strain-sensing means responsive to tension being connected as one pair of opposite bridge arms and said strain-sensing means responsive to compression being connected to the other pair of opposite bridge arms.

20. A tensiometer according to claim 16 wherein said first lateral support member has an opposite section which extends from said member in a laterally opposite direction with respect to the longitudinal axis thereof, said section of said first lateral support member being deflected and strained by a force resulting from a tension in the web and having opposite surface portions which undergo tension and compression respectively upon deflection, strain and being located on the opposite surface portions of said opposite section of said first lateral support member, and said bridge circuit means including a first bridge circuit for providing a signal indicative of a tension in the web in response to the deflection of said first lateral support member, said bridge circuit having two pairs of opposite bridge arms with said strain-sensing means responsive to tension being connected as one pair of opposite bridge arms and with said strain-sensing means responsive to compression being connected as the other pair of opposite bridge arms.

21. A tensiometer for measuring a tension in a web comprising frame means, a longitudinally extending member having a surface adapted to have a force exerted thereon by a tension in the web, a first lateral support member secured to said frame means and connected with an end of said member, a second lateral support member secured to said frame means and connected with the other end of said member, said first and second lateral support members extending generally transverse to said member and providing the sole support for said member, said first and second lateral support members each having sections thereof which extend from said member in laterally opposite directions with respect to the longitudinal axis thereof, said sections of said first and second lateral support members being deflected and strained by the force resulting from a tension in the web, said first and second sections of said first and second lateral support members each having opposite surface portions which undergo tension and compression respectively upon deflection, first, second, third and fourth strain-sensing means having an electrical impedance responsive to strain, said first and fourth strain-sensing means being located on said sections respectively of said first lateral support member and said second and third strain-sensing means being located on said sections respectively of said second lateral support member, said first and second strain-sensing means being located on surface portions which undergo tension and said third and fourth sensing means being located on surface portions which undergo compression, said first and third strain-sensing means being located respectively on said sections of said first and second lateral support members which extend from said member in one lateral direction and said fourth and second strain-sensing means being located respectively on said sections of said first and second lateral support members which extend from said member in the opposite lateral direction, a bridge circuit for providing a signal indicative of a tension in the web, said bridge circuit having two pairs of opposite bridge arms with said first and second strain-sensing means being connected as one pair of opposite bridge arms and said third and fourth strain-sensing means being connected as the other pair of opposite bridge arms, said bridge circuit having a pair of terminals for connection to a source of electrical power with one of said input terminals being connected between said first and fourth strain-sensing means and with the other of said input terminals being connected between said second and third strain-sensing means.

22. A tensiometer for measuring a tension in a web comprising frame means, a longitudinally extending member with a surface over which the web moves, said member having exerted thereon a load force resulting from a tension in the web and a torque force resulting from the movement of the web, support means secured to said frame means and connected to said member, said support means extending generally transverse to said member and providing the sole support for said member, said support means being strained by the load force and the torque force exerted on said member and strain means for providing a signal indicating said load force in response to the strain in said member comprising means for modifying said signal to compensate for errors induced due to the torque force, said means responsive to the strain of said support means including means for preventing the torque force from influencing said signal which is indicative of the load force.

UNITED STATES PATENT OFFICE
CERTIFICATE OF CORRECTION

Patent No. 3,589,181              Dated June 29, 1971

Inventor(s) Roland T. Palmatier and Robert Clinton Holland

It is certified that error appears in the above-identified patent and that said Letters Patent are hereby corrected as shown below:

Column 11, line 6, after "strain" insert -- sensing means having an electrical impedance responsive to strain --.

Signed and sealed this 4th day of January 1972.

(SEAL)
Attest:

EDWARD M. FLETCHER, JR.           ROBERT GOTTSCHALK
Attesting Officer                 Acting Commissioner of Patents